(12) United States Patent
Song et al.

(10) Patent No.: US 11,996,776 B2
(45) Date of Patent: May 28, 2024

(54) AUTOMOTIVE HIGH VOLTAGE RECTIFIER CIRCUIT

(71) Applicant: Ford Global Technologies, LLC, Dearborn, MI (US)

(72) Inventors: Yantao Song, Northville, MI (US); Baoming Ge, Okemos, MI (US); Lihua Chen, Farmington Hills, MI (US); Serdar Hakki Yonak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 203 days.

(21) Appl. No.: 17/570,545

(22) Filed: Jan. 7, 2022

(65) Prior Publication Data
US 2023/0223853 A1    Jul. 13, 2023

(51) Int. Cl.
*H02M 3/24* (2006.01)
*B60L 53/60* (2019.01)
*H02J 7/34* (2006.01)

(52) U.S. Cl.
CPC ............... *H02M 3/24* (2013.01); *B60L 53/60* (2019.02); *H02J 7/345* (2013.01); *B60L 2210/10* (2013.01); *H02J 2207/20* (2020.01)

(58) Field of Classification Search
CPC ...... H02M 3/24; B60L 53/60; B60L 2210/10; H02J 7/345; H02J 2207/20
USPC .................................................. 307/98, 10.1
See application file for complete search history.

(56) References Cited

U.S. PATENT DOCUMENTS

| | | | |
|---|---|---|---|
| 9,190,929 B2 * | 11/2015 | Divan | H02M 7/217 |
| 9,340,114 B2 | 5/2016 | Ferrel et al. | |
| 9,484,834 B2 | 11/2016 | Weis et al. | |
| 2007/0133232 A1 | 6/2007 | Sigamani | |
| 2010/0201285 A1 * | 8/2010 | Dellian | H02M 7/08 363/126 |
| 2015/0054337 A1 | 2/2015 | Ogale | |

FOREIGN PATENT DOCUMENTS

| | | |
|---|---|---|
| JP | 5521796 B2 | 6/2014 |
| KR | 20140084369 A | 7/2014 |
| WO | 2014028441 A2 | 2/2014 |

OTHER PUBLICATIONS

Costa et al., Single-Phase Voltage-Doubler SEPIC Rectifier with High Power Factor, May 2016, IEEE, pp. 522-527, May 2016.*

* cited by examiner

*Primary Examiner* — Michael R. Fin
(74) *Attorney, Agent, or Firm* — David B. Kelley; Brooks Kushman P.C.

(57) ABSTRACT

A power system includes a DC/AC converter, a traction battery, an AC/DC converter electrically connected between the DC/AC converter and traction battery, and a transformer electrically connected between the DC/AC converter and AC/DC converter. The AC/DC converter includes a plurality of semiconductor devices and a plurality of capacitors such that during power transfer from the DC/AC converter to the traction battery, a voltage across each of the capacitors is half of a battery voltage.

18 Claims, 5 Drawing Sheets

AUTOMOTIVE HIGH VOLTAGE RECTIFIER CIRCUIT

TECHNICAL FIELD

This disclosure relates to power systems for automotive vehicles.

BACKGROUND

Electrified vehicles may include traction and auxiliary batteries. The traction batteries may be used to power electric machines for propulsion. The auxiliary batteries may be used to power entertainment systems, interior lighting systems, etc. The traction and auxiliary batteries may be arranged such that one can charge the other.

SUMMARY

A power system includes a DC/AC converter having an input voltage, an AC/DC converter including a plurality of diodes and a plurality of capacitors, and a transformer, electrically connected between the DC/AC converter and the AC/DC converter, including terminals. The diodes and capacitors are arranged such that when a voltage across the terminals is in a positive half cycle, a first subset of the diodes are conducting, a first subset of the capacitors are in parallel, and a voltage across each of the capacitors is half the input voltage.

A vehicle has a power system including a DC/AC converter, a traction battery, an AC/DC converter electrically connected between the DC/AC converter and traction battery, and a transformer electrically connected between the DC/AC converter and AC/DC converter. The AC/DC converter includes a plurality of semiconductor devices and a plurality of capacitors such that during power transfer from the DC/AC converter to the traction battery, a voltage across each of the capacitors is half of a voltage of the traction battery.

A rectifier has circuitry including six diodes, three capacitors, input terminals, and output terminals collectively arranged such that when an AC voltage across the input terminals is in a positive half cycle, three of the diodes are conducting, two of the capacitors are in parallel, and a voltage across each of the capacitors is half the voltage measured between the output terminals.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
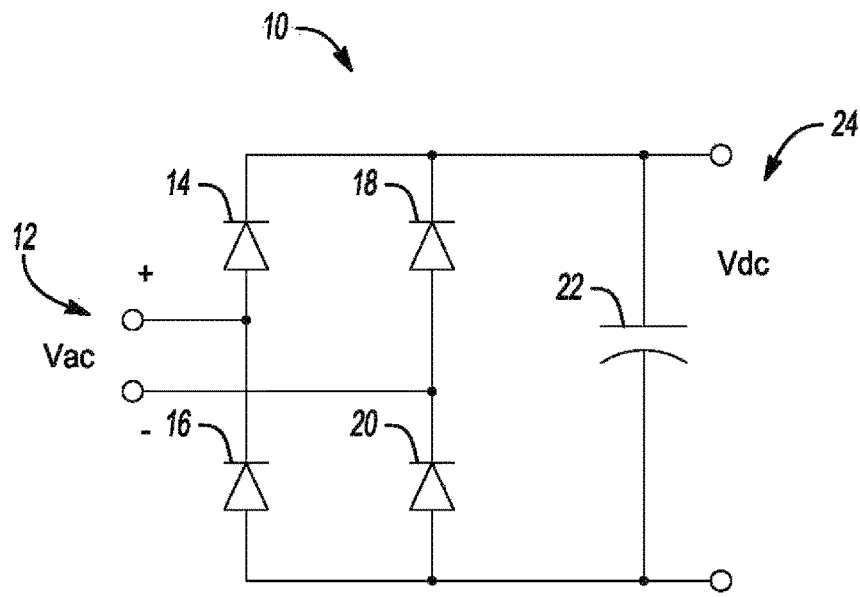
FIG. 1 is a schematic diagram of a typical passive rectifier circuit.

FIG. 1 shows a typical passive rectifier circuit 10 that converts AC electric power to DC electric power. It includes AC terminals 12, diodes 14, 16, 18, 20, link capacitor 22, and DC terminals 24. The diodes 14, 16 are in parallel with the diodes 18, 20. The link capacitor 22 is in parallel with the diodes 14, 16 and the diodes 18, 20. In this circuit, the voltage stress of the diodes 14, 16, 18, 20 is the voltage Vdc across the DC terminals. In applications in which Vdc is less than 450 V, diodes with a voltage rating less than 650 V can be selected. If, however, Vdc is greater than 450 V, the diodes may need a voltage rating greater than 650 V. Common issues for high voltage rating devices may include limited choice, higher expense, and lower performance (e.g., high voltage drop, high reverse recovery loss, high leakage current, lower switching speed limit, etc.).

Figure 2:
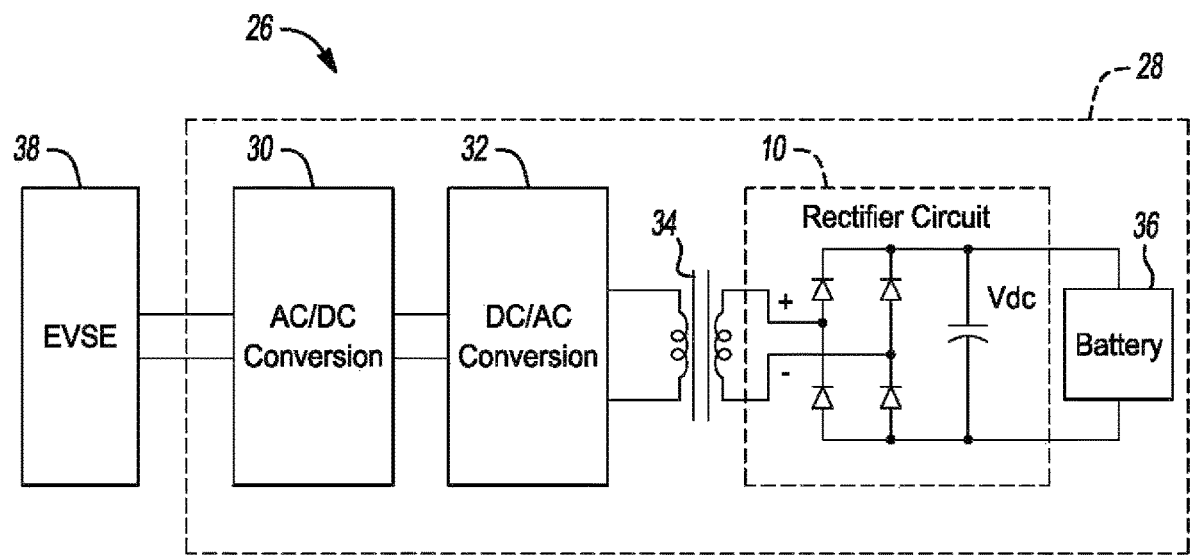
FIG. 2 is a block diagram of a vehicle with an on-board charger that includes the rectifier circuit of FIG. 1

As shown in FIG. 2, an application of the rectifier circuit 10 for an electric vehicle 26 is an on-board charger 28. The on-board charger 28 includes an AC/DC converter 30, a DC/AC converter 32, a transformer 34, the rectifier circuit 10, and a battery (e.g., traction battery) 36. The DC/AC converter 32 is electrically connected between the AC/DC converter 30 and the transformer 34. The transformer 34 is electrically connected between the DC/AC converter 32 and the rectifier circuit 10. The rectifier circuit 10 is electrically connected between the transformer 34 and the traction battery 36. The rectifier circuit 10 converts AC electricity to DC electricity to charge the traction battery 36, which is an energy source for the vehicle 26. This electricity is delivered to the vehicle 26 via electric vehicle supply equipment 38 that is electrically connected with the AC/DC converter 30. The voltage rating of the diodes 14, 16, 18, 20 is determined by the voltage of the traction battery 36.

To meet the increasing demands of high-driving-capability electric vehicles, the power capability of traction inverters and motors has dramatically increased. The increasing power demand challenges design of inverter/motor and high voltage cable systems. One option of increasing power capability of electric vehicle driving systems is to increase the traction battery voltage to 500 V, 600 V, or 800 V. This increased battery voltage greatly increases the power capability of the traction inverter/motor without increasing the current rating of inverter/motor and high voltage cable systems. Higher battery voltage increases, however, may stress the rectifier devices 14, 16, 18, 20, and so devices with voltage ratings greater than 650 V are likely used. For example, if the battery voltage is 800 V, the voltage stress of the rectifier devices 14, 16, 18, 20 is 800 V, and so 1200 V rated devices are likely used. High voltage devices may lead to higher on-board charger expense and lower efficiency. Here, a three-level rectifier circuit is proposed to address these issues.

Figure 3:
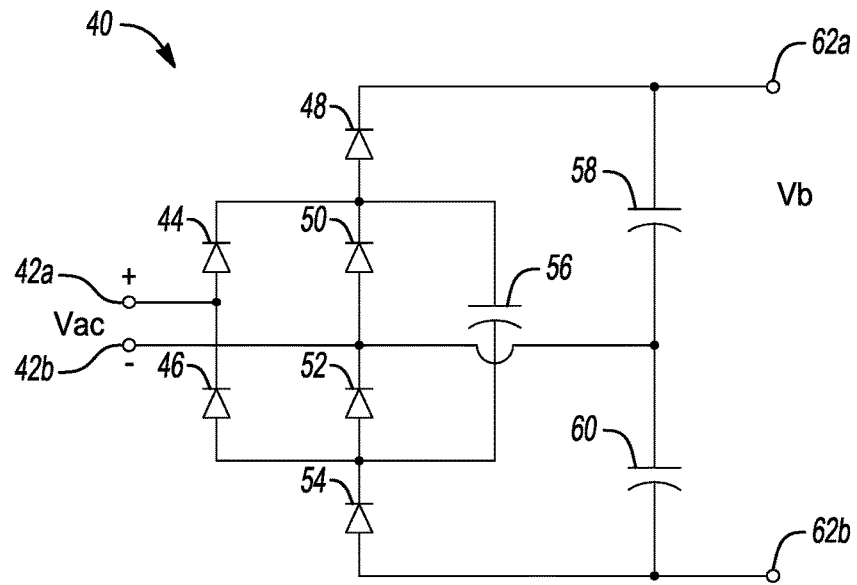
FIG. 3 is a schematic diagram of a proposed rectifier circuit.

As shown in FIG. 3, a three-level rectifier circuit 40 includes AC terminals 42a, 42b, power semiconductor devices (e.g., diodes) 44, 46, 48, 50, 52, 54, link capacitors 56, 58, 60, and DC terminals 62a, 62b. The power semiconductor devices 44, 46 are series connected, the power semiconductor devices 48, 50, 52, 54 are series connected, and the link capacitors 58, 60 are series connected. The power semiconductor devices 44, 46, the power semiconductor devices 50, 52, and the link capacitor 56 are in parallel. The AC terminal 342a is electrically connected between the power semiconductor devices 44, 46. The AC terminal 42b is electrically connected between the power semiconductor devices 50, 52 and the link capacitors 58, 60.

This arrangement reduces the voltage stress of the power semiconductor devices 44, 46, 48, 50, 52, 54 to half of voltage Vb across the DC terminals 62a, 62b. When the voltage across the AC terminals 42a, 42b is in the positive half cycle, the power semiconductor devices 44, 48, 52 will be conducting (ON), the power semiconductor devices 46, 50, 54 will not be conducting (OFF), and the link capacitors 56 and 58 will be in parallel and charged. When the voltage across the AC terminals 42a, 42b is in the negative half cycle, the power semiconductor devices 46, 50, 54 will be conducting (ON), the power semiconductor devices 44, 48, 52 will not be conducting (OFF), and the link capacitors 56 and 60 will be in parallel and charged. The voltages of the link capacitors 56, 58, 60 are thus the same and equal to half of Vb. And, the voltage stress of the power semiconductor devices 44, 46, 48, 50, 52, 54 is the voltage across the link capacitors 56, 58, 60 and equal to half of Vb. Therefore, power semiconductor devices with lower-voltage ratings can be used.

Figure 4:
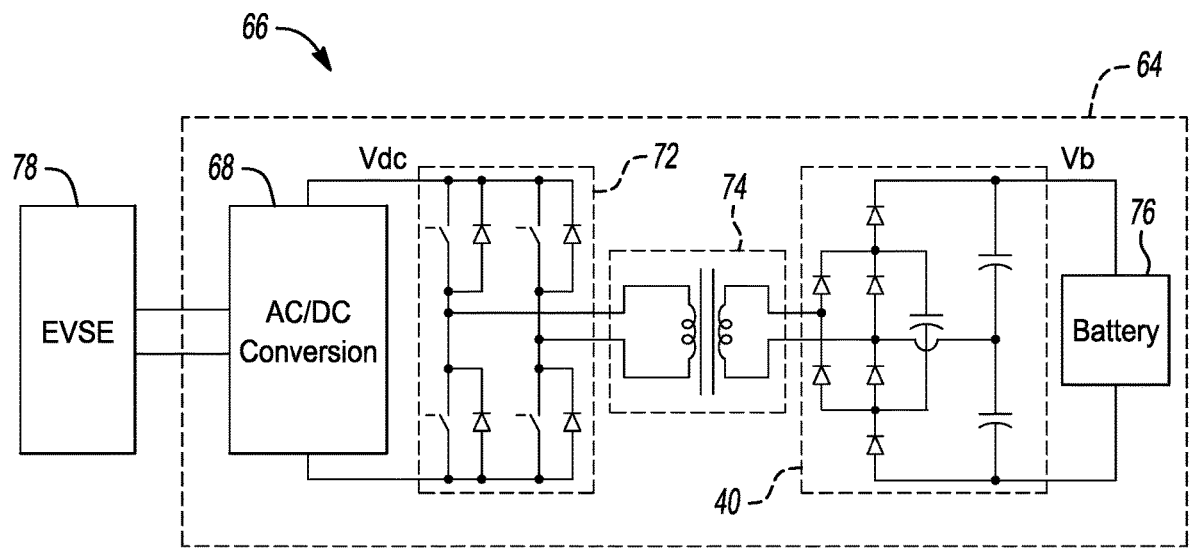
FIG. 4 is a block diagram of a vehicle with an on-board charger that includes the rectifier circuit of FIG. 3.
Figure 5:
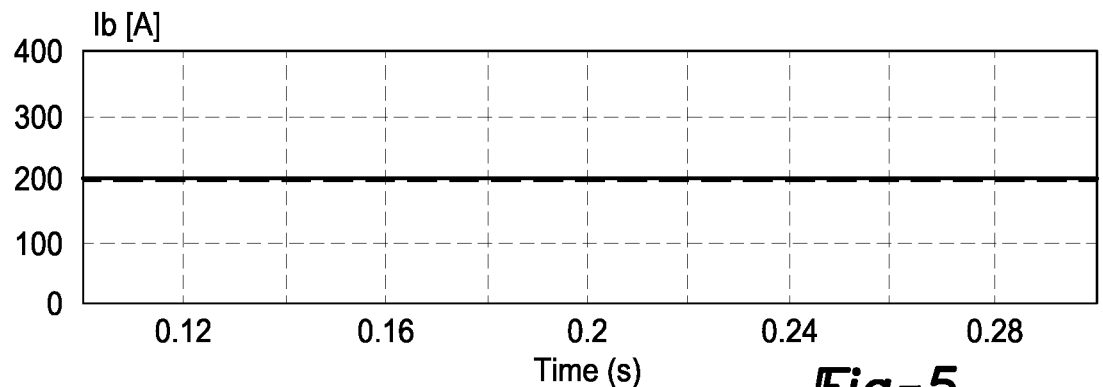
FIG. 5 is a trace of battery charge current versus time for the rectifier circuit of FIG. 3 when battery voltage is 800 V and charging current is 200 A.
Figure 6:
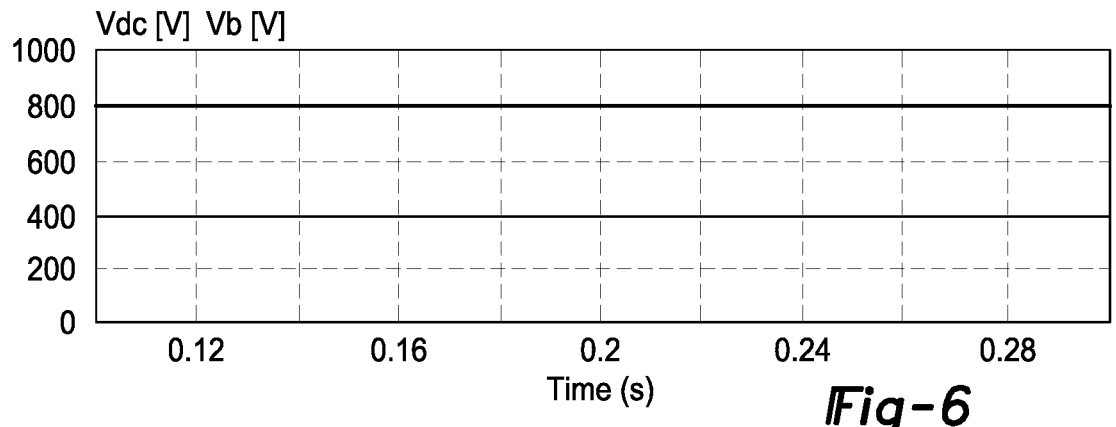
FIG. 6 are traces of DC link voltage and battery voltage versus time under the conditions noted for FIG. 5.
Figure 7:
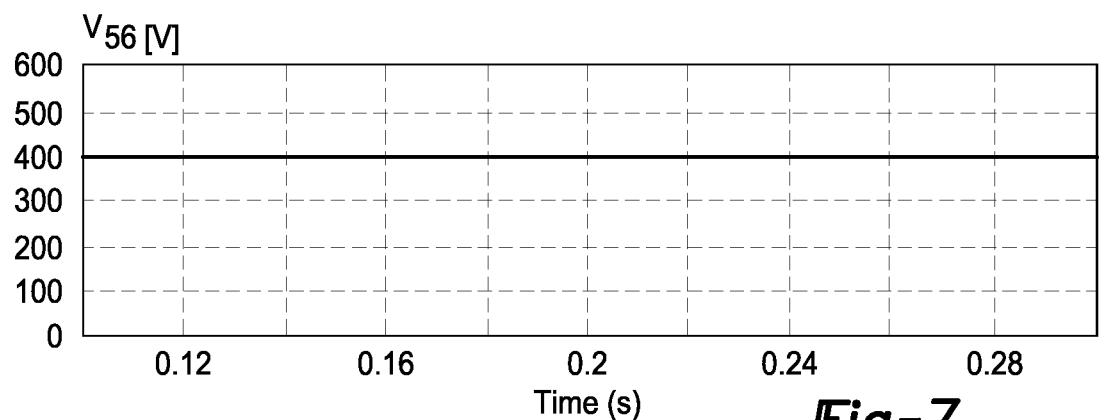
FIGS. 7 and 8 are traces of link capacitor voltages versus time under the conditions noted for FIG. 5.
Figure 8:
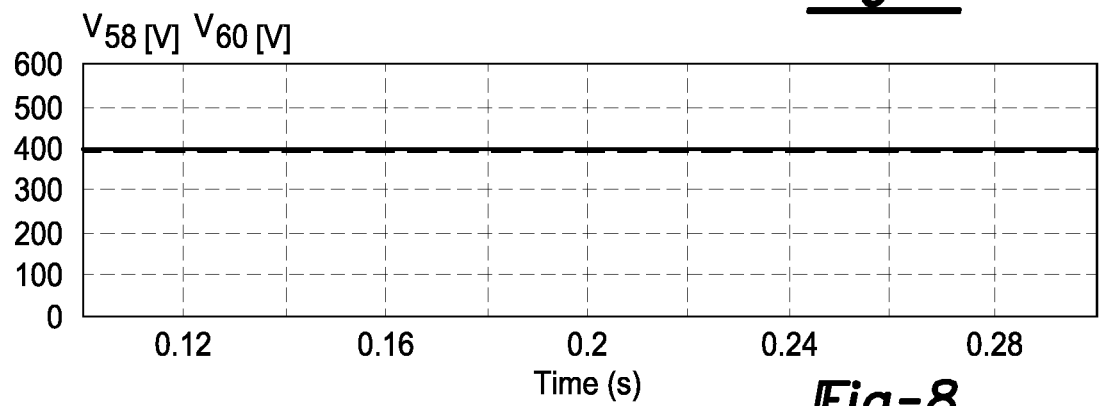
Figure 9:
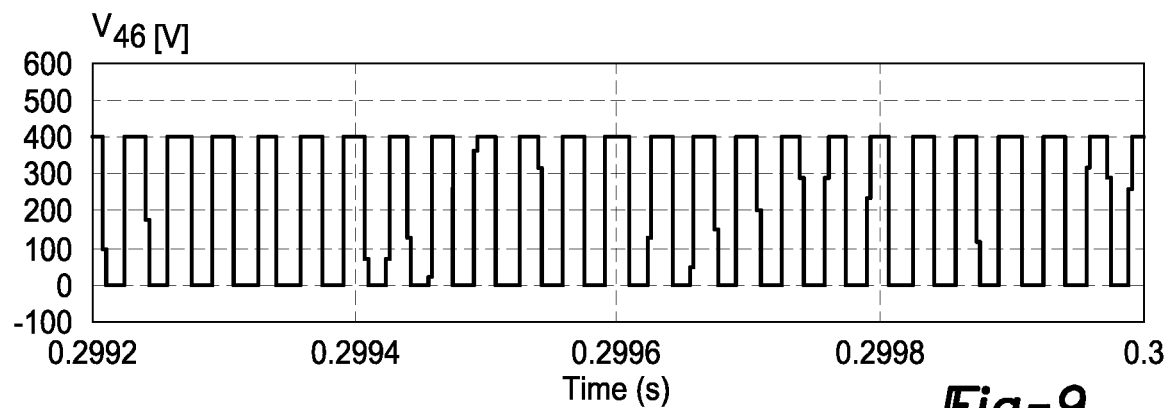
FIGS. 9 and 10 are traces of power semiconductor device voltage under the conditions noted for FIG. 5.
Figure 10:
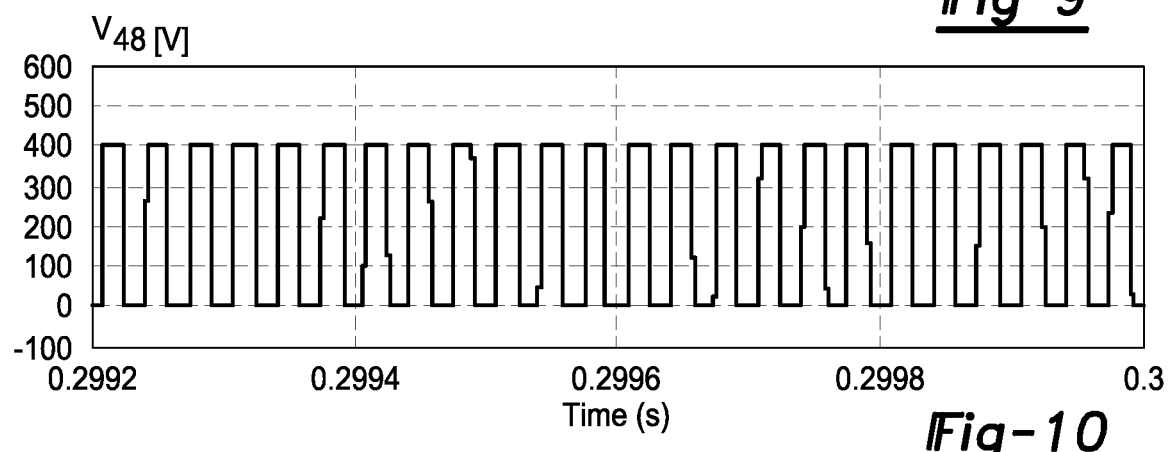
Figure 15:
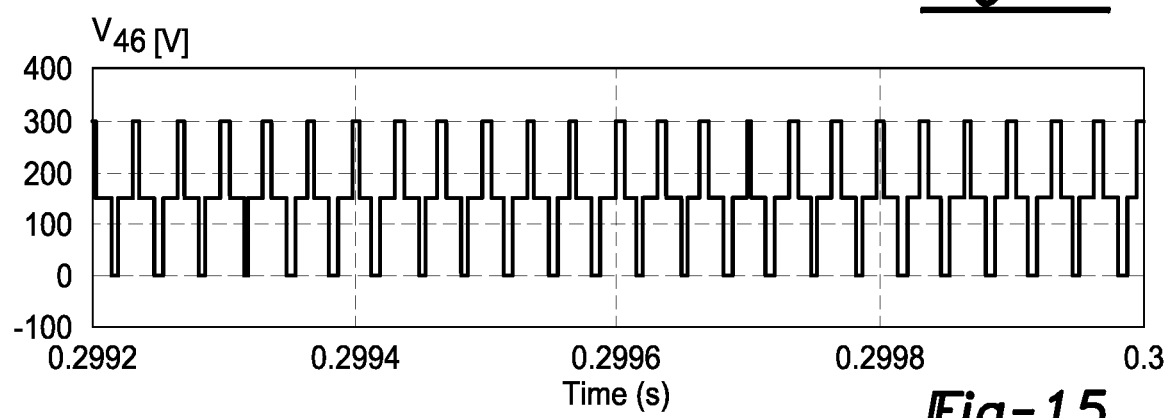
FIGS. 15 and 16 are traces of power semiconductor device voltage under the conditions noted for FIG. 11.
Figure 16:
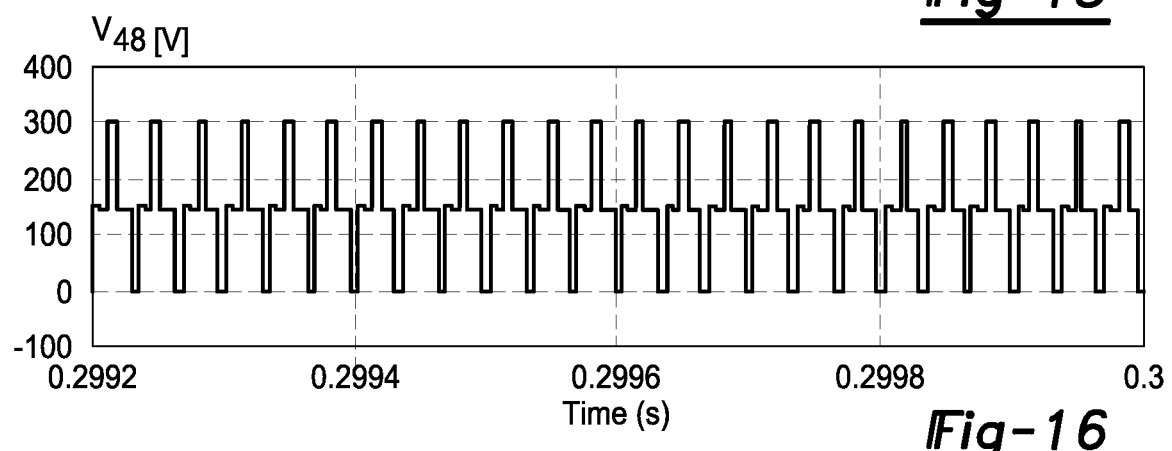
Figure 11:
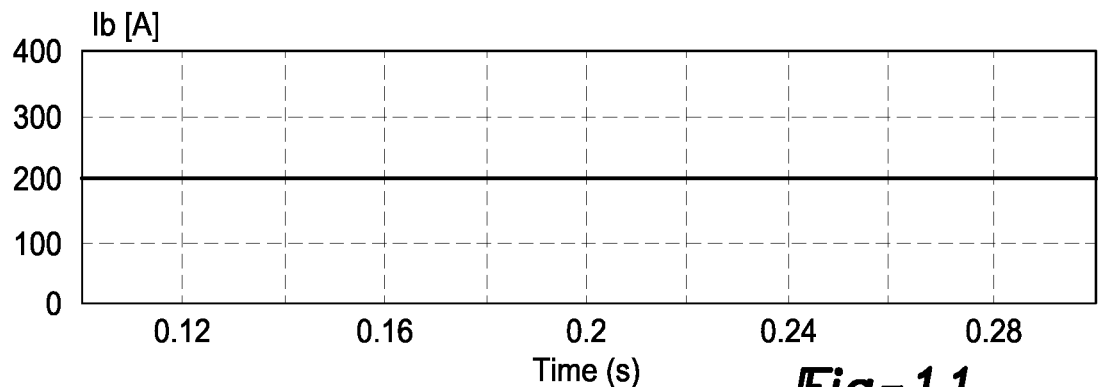
FIG. 11 is a trace of battery charge current versus time for the rectifier circuit of FIG. 3 when battery voltage is 600 V and charging current is 200 A.
Figure 12:
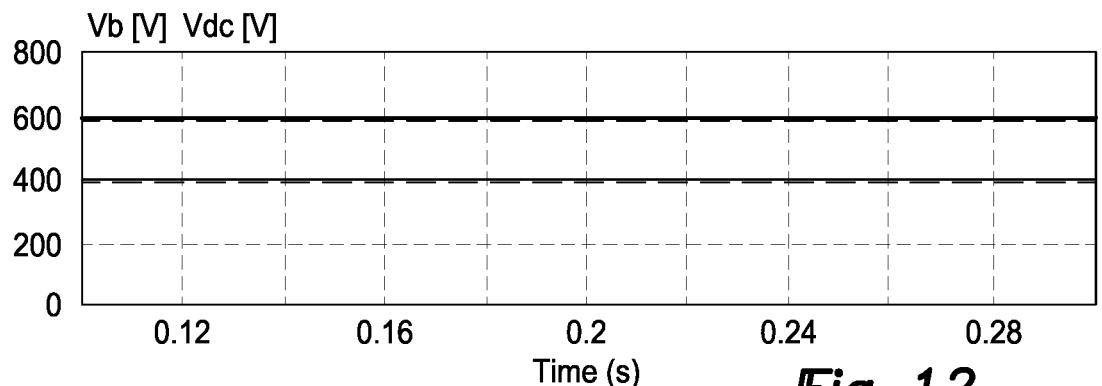
FIG. 12 are traces of DC link voltage and battery voltage versus time under the conditions noted for FIG. 11.
Figure 13:
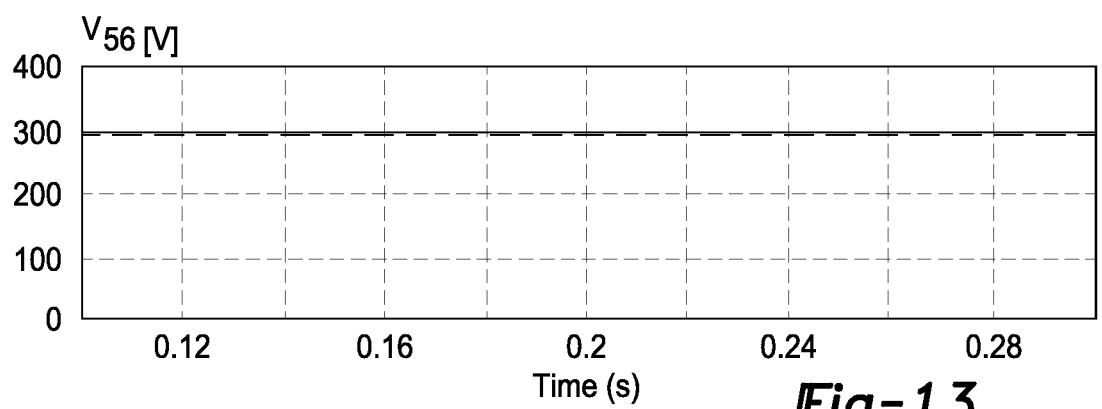
FIGS. 13 and 14 are traces of link capacitor voltages versus time under the conditions noted for FIG. 11.
Figure 14:
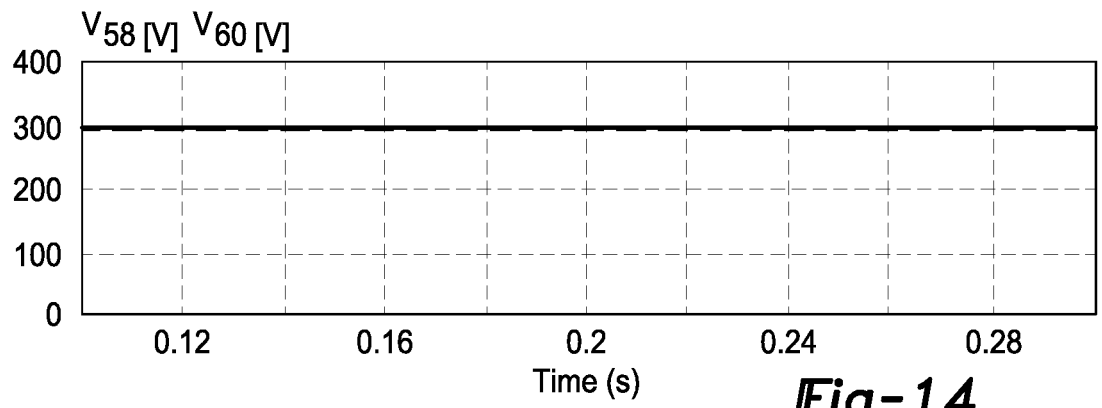

FIG. 4 shows the application of the rectifier circuit 40 in an on-board charger 64 for an electric or hybrid vehicle 66. The on-board charger 64 includes an AC/DC converter 68, a DC/AC converter 72, a transformer 74, the rectifier circuit 40, and a battery (e.g., traction battery) 76. The DC/AC converter 72 is electrically connected between the AC/DC converter 68 and the transformer 74. The transformer 74 is electrically connected between the DC/AC converter 72 and the rectifier circuit 40. The rectifier circuit 40 is electrically connected between the transformer 74 and the traction battery 76. The rectifier circuit 40 converts AC electricity to DC electricity to charge the traction battery 76, which is an energy source for the vehicle 66. This AC electricity is delivered to the vehicle 66 via electric vehicle supply equipment 78 that is electrically connected with the AC/DC converter 68. The voltage rating of the power semiconductor devices 44, 46, 48, 50, 52, 54 is determined by the voltage of the traction battery 76.

If the voltage of the traction battery 76 is 800 V, the voltage across each of the link capacitors 56, 58, 60 is 400 V, the voltage stress of each of the power semiconductor devices 44, 46, 48, 50, 52, 54 is 400 V, and therefore 600 V power semiconductor devices (e.g., diodes) can be used for the power semiconductor devices 44, 46, 48, 50, 52, 54. In contrast, for the rectifier circuit 10, 1200 V power semiconductor devices would be used.

FIGS. 5 through 16 show simulation results. In these simulations, the switching frequency is 30 kHz, the turns ratio of the transformer is 1:1, and in FIG. 3, Vdc is controlled at 400 V by the converter.

FIGS. 5 through 10 show a case when battery voltage, Vb, is 800 V and charging current, Ib, is 200 A. The link capacitors 56, 58, 60 have the same voltage of 400 V ($V_{56}$, $V_{58}$, $V_{60}$), so the power semiconductor devices 44, 46, 48, 50, 52, 54 show 400 V voltage stress (e.g., $V_{46}$, $V_{48}$).

FIGS. 11 through 16 show a case when battery voltage, Vb, is 600 V and charging current, Ib, is 200 A. The link capacitors 56, 58, 60 have the same voltage of 300 V ($V_{56}$, $V_{58}$, $V_{60}$), so the power semiconductor devices 44, 46, 48, 50, 52, 54 show 300 V voltage stress (e.g., $V_{46}$, $V_{48}$).

Here, a three-level rectifier circuit is proposed to reduce the voltage stress by half in comparison with existing rectifier circuits. Lower voltage stress enables power semiconductor devices with lower voltage ratings and higher performance to be used for applications of high battery voltage based electric drive system, which can reduce converter expense and improve conversion efficiency. For example, if an on-board charger for an electric vehicle with an 800 V battery uses an existing rectifier circuit, higher-expense and lower-performance 1200 V diodes are likely used. If, however, the proposed rectifier circuit is used, lower-expense and higher-performance 600 V diodes can be used. Therefore, on-board charger expense can be reduced and efficiency can be improved.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system of a vehicle comprising:
a DC/AC converter having an input voltage;
an AC/DC converter including a plurality of diodes and a plurality of capacitors; and
a transformer, electrically connected between the DC/AC converter and the AC/DC converter, including terminals, wherein the diodes and capacitors are arranged such that when a voltage across the terminals is in a positive half cycle, a first subset of the diodes are conducting, a first subset of the capacitors are in parallel, and a voltage across each of the capacitors is half the input voltage.

2. The power system of claim 1, wherein the diodes and capacitors are further arranged such that when the voltage across the terminals is in a negative half cycle, a second subset of the diodes are conducting, at least one of the first subset of the capacitors and at least one of the other of the capacitors are in parallel, and a voltage across each of the capacitors is half the input voltage.

3. The power system of claim 1 further comprising a traction battery, wherein the AC/DC converter is electrically connected between the transformer and traction battery.

4. The power system of claim 1, wherein the plurality of diodes is six diodes and wherein the first subset of the diodes is three of the six diodes.

5. The power system of claim 4, wherein four of the six diodes are series connected.

6. The power system of claim 3, wherein the plurality of capacitors is three capacitors.

7. The power system of claim 6, wherein two of the three capacitors are series connected.

8. The power system of claim 7, wherein the two series connected capacitors are in parallel with the traction battery.

9. A vehicle comprising:
a power system including a DC/AC converter, a traction battery, an AC/DC converter electrically connected between the DC/AC converter and traction battery, and a transformer electrically connected between the DC/AC converter and AC/DC converter, wherein the AC/DC converter includes a plurality of semiconductor devices and threea plurality of capacitors such that during power transfer from the DC/AC converter to the traction battery, a voltage across each of the capacitors is half of a voltage of the traction battery.

10. The vehicle of claim 9, wherein the semiconductor devices and capacitors are arranged such that when a voltage across terminals of the transformer is in a positive half cycle, a first subset of the semiconductor devices are conducting and a first subset of the capacitors are in parallel.

11. The vehicle of claim 10, wherein the semiconductor devices and capacitors are further arranged such that when the voltage across the terminals is in a negative half cycle, a second subset of the semiconductor devices are conducting and at least one of the first subset of the capacitors and at least one of the other of the capacitors are in parallel.

12. The vehicle of claim 9, wherein the plurality of semiconductor devices is six semiconductor devices.

13. The vehicle of claim 12, wherein four of the six semiconductor devices are series connected.

14. The vehicle of claim 9, wherein two of the capacitors are series connected.

15. The vehicle of claim 14, wherein the two series connected capacitors are in parallel with the traction battery.

16. The vehicle of claim 9, wherein the semiconductor devices are diodes.

17. A rectifier comprising:
circuitry including six diodes, three capacitors, input terminals, and output terminals collectively arranged such that when an AC voltage across the input terminals is in a positive half cycle, three of the diodes are conducting, two of the capacitors are in parallel, and a voltage across each of the capacitors is half the voltage measured between the output terminals.

18. The rectifier circuit of claim 17, wherein the six diodes, three capacitors, input terminals, and output terminals are further collectively arranged such that when the AC voltage is in a negative half cycle, three other of the diodes are conducting, one of the two capacitors and the other of the three capacitors are in parallel, and a voltage across each of the capacitors is half the voltage measured between the output terminals.

* * * * *